Figure 1:
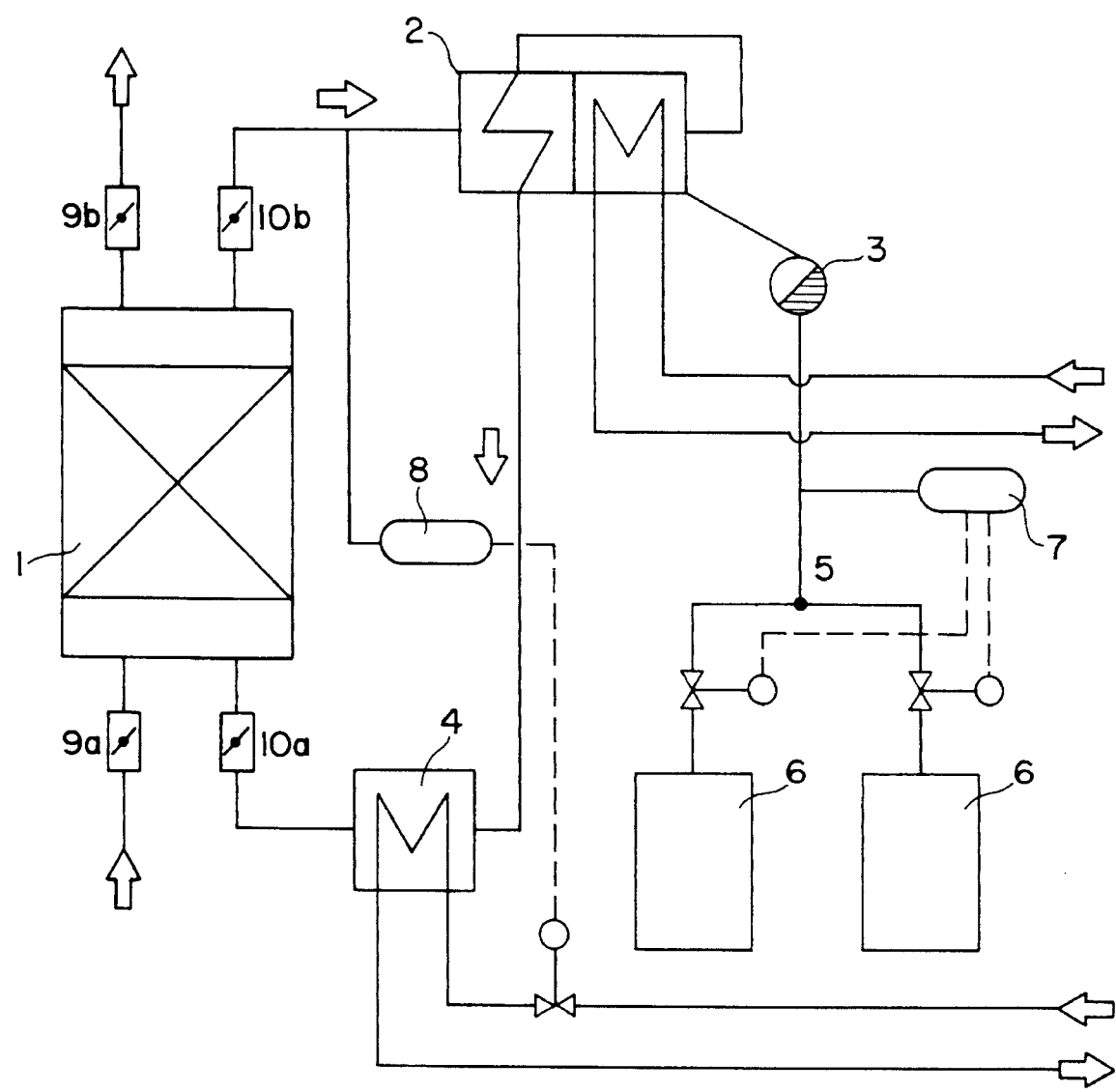

United States Patent [19]
Berwian et al.

[11] Patent Number: 5,547,491
[45] Date of Patent: Aug. 20, 1996

[54] PROCEDURE FOR THE SELECTIVE RECOVERY OF SOLVENTS FROM SOLVENT GAS MIXTURES AND DEVICE FOR THE REALIZATION OF THE PROCEDURE

[75] Inventors: Werner Berwian, Idar-Oberstein; Thomas Frohs, Höringen; Rolf Rafflenbeul, Frankfurt am Main, all of Germany

[73] Assignees: Adolf Lony KG Flexible Verpackungen, Lauterecken; Rafflenbeul & Partner, Frankfurt am Main, both of Germany

[21] Appl. No.: 300,104

[22] Filed: Sep. 1, 1994

[30] Foreign Application Priority Data

Sep. 2, 1993 [DE] Germany ............... 43 29 642.4
Jul. 8, 1994 [DE] Germany ............... 44 24 155.0

[51] Int. Cl.$^6$ .................. B01D 53/047; B01D 53/14
[52] U.S. Cl. .............. 95/12; 95/41; 95/42; 95/106; 95/123; 95/126; 95/143; 96/111; 96/115; 96/122; 96/127; 96/132; 96/144
[58] Field of Search ............. 95/106, 123–126, 95/141–147, 1, 8, 12, 39, 41, 42; 96/108, 109, 111, 115, 121, 122, 126–128, 132, 143, 144, 146

[56] References Cited

U.S. PATENT DOCUMENTS

| | | | |
|---|---|---|---|
| 2,642,153 | 6/1953 | Parks ............................. | 95/143 X |
| 3,121,002 | 2/1964 | Kilgore et al. ................ | 95/124 |
| 3,137,549 | 6/1964 | Kilgore et al. ................ | 95/124 |
| 3,436,839 | 4/1969 | Ellington ....................... | 34/80 |
| 3,551,102 | 12/1970 | Hettick et al. ................ | 23/193 |
| 4,231,764 | 11/1980 | Mattia ........................... | 95/141 X |
| 4,289,505 | 9/1981 | Hardison et al. .............. | 95/141 |
| 4,536,197 | 8/1985 | Cook .............................. | 55/28 |
| 4,874,524 | 10/1989 | Liapis et al. .................. | 95/144 X |
| 5,198,001 | 3/1993 | Knebel et al. ................. | 95/126 X |

FOREIGN PATENT DOCUMENTS

| | | |
|---|---|---|
| 2735568 | 6/1978 | Germany . |
| 62-289217 | 12/1987 | Japan . |

*Primary Examiner*—Robert Spitzer
*Attorney, Agent, or Firm*—Finnegan, Henderson, Farabow, Garrett & Dunner

[57] ABSTRACT

A process and apparatus for the selective recovery of solvents from solvent gas mixtures according to which the solvent gas mixture undergoes a sorption process, individual solvent gas fractions are fractionally desorbed from the sorption agent, condensed at staggered time intervals, measured to determine their composition, and collected separately.

20 Claims, 2 Drawing Sheets

PROCEDURE FOR THE SELECTIVE RECOVERY OF SOLVENTS FROM SOLVENT GAS MIXTURES AND DEVICE FOR THE REALIZATION OF THE PROCEDURE

DESCRIPTION

The invention concerns a procedure for the selective recovery of solvents from solvent gas mixtures, as well as a device for the realization of such a procedure.

In the overwhelming number of technical procedures which make use of solvents, gas mixtures are applied. The solvent's purpose is to produce, intermediately with solid matter, a liquid which makes possible a defined abatement of the liquid components (solvents) during usable. The overwhelming field of application of such solvent gas mixtures are colours, dyes and inks, and adhesives. Since solvents as substances am injurious to health, but also as substances of value, are not to be released into the open, it is necessary to retain the solvents in a sufficient manner.

Sorption facilities which recover solvents from gas or gas mixtures are in wide usage. In such facilities the solvent is predominantly adsorbed by an adsorbent, usually activated carbon, and is desorbed and recovered by means of subsequent treatment in concentrated form after a technically suitable enrichment in the coal. Such a procedure is for example employed after print processes, after paint procedure and especially after drying processes during which solvents evaporate. There, for the transport of the emitted solvent gas from the immediate area of usage, a so-called tow-, drying-, or carder gas - as already mentioned, very often air - is used. This tow air, usually termed waste gas, is led into an absorption facility where, as mentioned above, the solvent gas is removed from the tow air and recovered.

Whereas in mono systems which contain only one solvent to be sorbed the recovery of the desorbed solvents by condensation can be done successfully without any problems in a reusable form, to this day large-scale procedure operations are necessary in order to recover solvent mixtures separately.

The possibilities employed until today are the fractionalized condensation of the desorbed solvent gas mixture, and, alternatively, the distillation and rectification of the accumulated solvent mixtures.

In both of these procedure variants, the solvent mixture is desorbed as a whole from the sorption agent and fractionalized afterwards by means of condensation or distillation and rectification. Both these procedures are in need of very high technical efforts and financial expenses, especially when azeotrope mixtures are concerned. Moreover, with complicated azeotrope mixtures the fractionalized condensation fails.

The task of the invention presented here is to provide a procedure for the recovery of solvents from solvent gas mixtures by means of which the above-said drawbacks may be avoided. Especially, the procedure should be technically simple, effective and possible to be carried out without large-scale equipment. Accordingly, a further task is to provide a suitable device for the realization of this procedure.

For the solution of the foregoing, the first task consists in a procedure for the select recovery of solvents from solvent gas mixtures which comprises the steps of the sorption of the solvent gas mixture into a sorption agent, the desorption of the solvent gas mixture from the sorption agent, the condensation and collection of the solvent gas mixture liquified after condensation, and which is characterized in the way that singular solvent gas fractions are desorbed from the sorption agent fractionalized and that these desorbed solvent gas fractions are condensed staggered in time and are collected separately from each other.

According to the foregoing procedure the step of the sorption may contain an adsorption or an absorption of the solvent gas mixture.

In the case of adsorption, the solvent gas mixture is adsorbed preferably by means of active carbon(s), molecular sieve(s) or a combination of both. Mostly the activated carbons and molecular sieves show a specific surface of up to 1500 $m^2/g$ and exist in pelletized, fibrous or powdery form.

In case of an absorption silicone oils or highly simmering ester, as for example dioctylphtalate, are preferably employed as absorption agents.

On the whole, in the procedure according to this invention the solvent gas mixture is sorbed at a pressure from 1 bar to 10 bar and a temperature from $-20°C$ to $80°$ C.

Preferably the solvent gas mixture is moved together with a carrier gas preferably an inert gas, e.g. nitrogen or carbon dioxide or air. The concentration of the solvent gas mixture in the carrier gas is preferably adjusted between 0.5 $g/m^3$ carrier gas and 100 $g/m^3$ carrier gas.

The carrier gas can be employed in the continuous procedure or in the cycle procedure.

According to a variant of the procedure of the present invention the singular solvent gas fractions are desorbed from the sorption agent fractionalized at a constant pressure and a constant temperature.

According to another variant it is also possible to desorb the singular solvent gas fractions from the sorption agent fractionalized, whereby the pressure is reduced gradually and/or the temperature is increased gradually. Here one will decrease the desorption pressure and/or increase the desorption temperature respectively, if the solvent gas mass flow from the sorption agent has fallen below a certain level. The solvent gas mass flow is hereby measured in the desorption gas flow or in the condensed solvent fraction flow. The measuring in the desorption gas is carried out in an advantageous manner by means of a caloric concentration measuring device and/or a total hydrocarbon detector, whereas the measuring in condensed solvent fraction flows is carried out preferably by means of a floating volume flow measuring device.

The desorption of the isolated solvent gas fractions takes place advantageously at a pressure in the range of 1 bar to 10 bar and at a temperature in the range of $35°$ C. to $200°$ C., depending on the solvents to be separated.

The isolated solvent gas fractions are desorbed fractionatedly according to a preferred form of realization from the sorption agent by means of a carder gas. Hereby the carrier gas usually is chosen from the line of inert gas (nitrogen, carbon dioxide), air or steam.

A special variant of the procedure according to this invention, which is especially suitable for solvent gas mixtures with similar sorption- and desorption reactions, is characterized in the way that one sorbs again selectively the solvent gas fraction desorbed from the sorption agent at a certain pressure and at a certain temperature with the help of an intermediate sorption agent. Afterwards, this solvent gas fraction is desorbed fractionalized and staggered in time and the isolated fractions are condensed and gathered separately from each other.

Preferably, with the above said realization of the procedure according to this invention, the solvent gas fraction desorbed from the sorption agent is sorbed in the intermediate sorption agent at a, in comparison with the desorption from the sorption agent, lower temperature and/or higher pressure.

In the case of an adsorption, the intermediate sorption agent comprises preferably activated carbon(s) and/or molecular sieve(s). An intermediate absorption agent comprises advantageously silicone oils and/or highly simmering ester.

According to the above-said variant procedure, by employment of an intermediate sorption agent. In a special form of realization the solvent gas fractions are desorbed from the intermediate sorption agent at a pressure and a temperature which agrees with the temperature of the desorption from the sorption agent.

Furthermore, the not sorbed gas which emits from the intermediate sorption agent is preferably adjusted to the pressure and the temperature according to the preceding desorption from the sorption agent and returned to the sorption agent.

By the procedure according to this invention, the isolated, desorbed solvent gas fractions can be dried before the condensation by means of a drying agent.

In a staggered-in-time condensation of the isolated, desorbed solvent gas fractions usually a constant pressure and a constant temperature is chosen, which preferably ranges from 1 bar to 10 bar resp. from 10° C. to −50° C., depending on the respective solvent gas mixture. The isolated condensed solvent gas fractions in the procedure according to this invention are collected separately in different vessels in such a way, that one switches the condensed solvent fraction flow from one vessel to the next, depending on the composition of the solvent fraction. The changing or switching in this case is usually done by means of a control element which is installed behind the condensating device.

In the above-said step of procedure, the composition of the solvent fraction in the desorption gas after the sorption plant or intermediate sorption plant and/or in the condensed solvent fraction flow is preferably measured. The measuring in the desorption gas is done here advantageously by means of a caloric concentration measuring device and/or a total hydrocarbon detector, whereas the measuring in the condensed solvent fraction flow is advantageously done by means of a refractometer and/or a density device.

The invention furthermore provides a device for the realization of the procedure according to the invention which comprises a sorption plant, a cooling apparatus for condensation, a condensating device, a measuring device for the composition and/or the quantity of the desorption gases and/or the solvent condensate, a switching- and distribution device for the solvent condensate and a collection vessel for the individual, condensed solvent fractions.

In general, the movement of gas in the above mentioned device is done by ventilators.

The sorption plant in general has an inlet for solvent gas mixtures and respectively an outlet for the purified gas as well as an inlet and an outlet for the circulating desorption gas. Moreover, it comprises a heater for the circulated desorption gas.

A specific execution of the device according to the invention comprises an intermediate sorption plant between the sorption plant and the cooling device for the condensation process as well as a cooler to cool the desorption gas between the sorption plant and the intermediate sorption plant.

The device according to the invention may also be characterized by having a collection vessel for the rejected mixed fractions.

The invention is described in the following relating to the FIGS. 1 and 2:

FIG. 1:

Device to execute a procedure according to the invention at solvent gas mixtures with various reactions to sorption and desorption of the individual solvents.

FIG. 2:

Device to execute the procedure according to the invention at solvent gas mixtures with similar reactions to sorption and desorption of the individual solvents.

The device as mentioned in FIG. 1 is suitable for the selective recovery of solvents, which show significantly different reactions to the sorption and desorption process.

In this process, the waste air loaded with a solvent gas mixture, e.g. Ethylacetate and butylglycol, is led to the sorption plant (1), which comprises an inlet for the solvent gas mixture (9a) and a respective outlet for the purified gas (9b). Both of the solvent gas mixture components remain in the sorption agent.

A so-called balanced lead in the sorption agent occurs after a certain period of time depending on the solvent mass flow, the sorption agent quantity and the environmental conditions (pressure, temperature). This means that the sorption agent took such a quantity of solvent that at least one solvent gas component led in with the waste gas cannot be kept in sufficient quantity. Therefore, it is required to purify the agent, that is to desorbed the sorbed solvent gas components. This is done at selected conditions regarding pressure, temperature and carrier gas (flow), so that the solvent gas component undergoes fractionized desorption (at staggered time intervals).

Desorption gas is led to an inlet (10a) into the sorption plant and gas flow, desorbed from the sorption plant (1) via the outlet (10b), which basically contains only one respective solvent gas component, is cooled with the help of a cooler (2) to a preset temperature end condensed in the condensating device (3). Via a switching and distribution device (5) the solvent condensate is led to a previously determined collection vessel (6). The desorption gas among from the cooling device (2), released from the condensate is then heated in the heater (4) and returned to the sorption plant (1) via the inlet (10a).

For process control, there is a measuring device for the solvent mass flow in the desorption gas (8) and for the composition of the solvent in the condensed solvent fraction flow (7).

With the help of a refractometer and/or a density measuring device it is possible, to control the quality of the condensed solvent and to change from one collection vessel (6) to the next collection vessel (6) depending on the composition of the solvent condensate, i.e. when transferring from one condensate composition of one solvent component to the next solvent component.

A caloric measuring device and/or total hydrocarbon detector provides for a recording of the decrease of the solvent gas mass flow occurring at a certain temperature and at a certain pressure. When falling below a certain limit the temperature may be increased by means of a heater (4) in a way that, after the residual components of the first fraction are being desorbed, the next, more compact sorbed fraction is desorbed.

Figure 2:
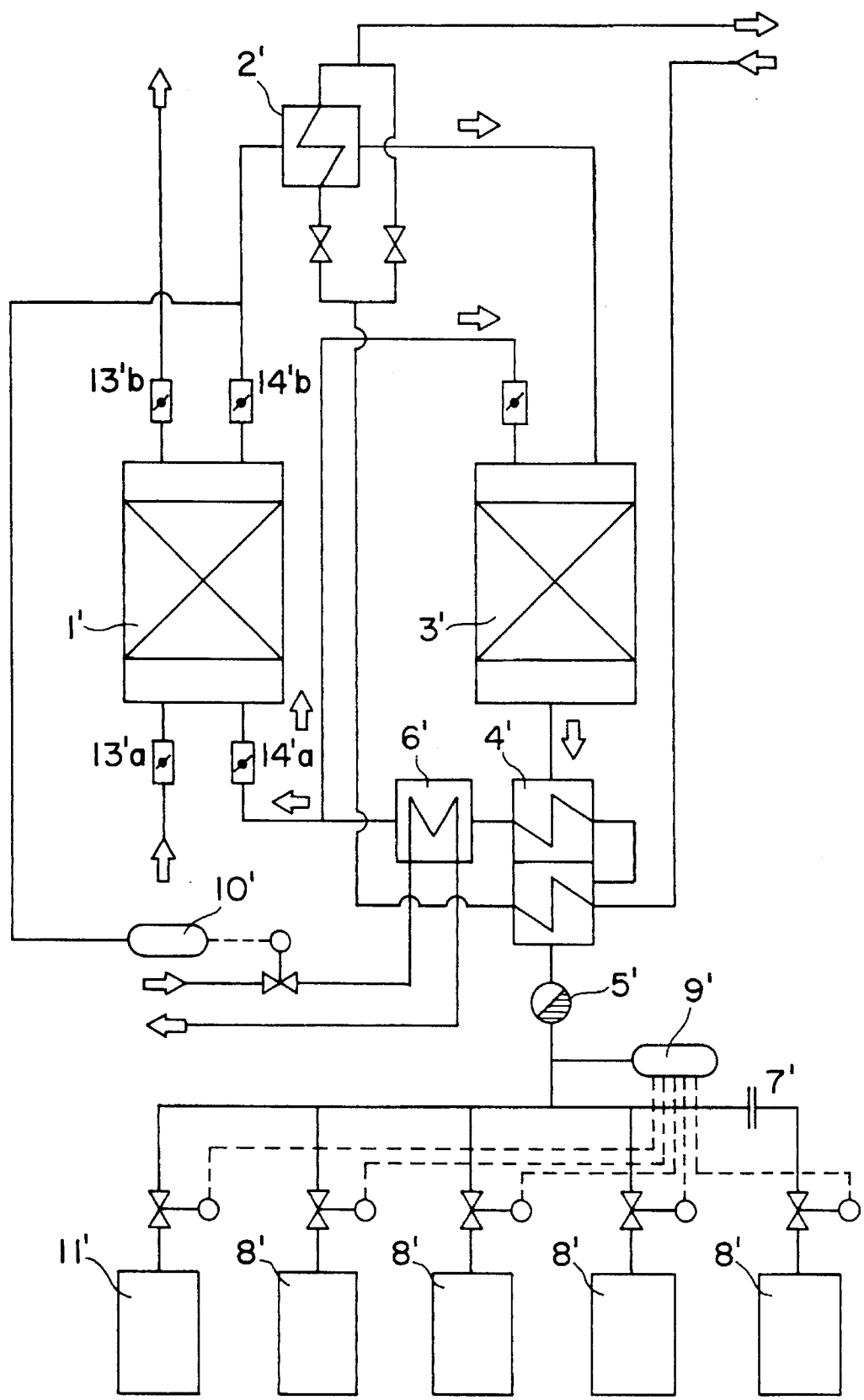

According to FIG. 2 a procedure and a device is shown, which is suitable in case of having several solvent gas components with similar sorption and desorption properties.

The waste gas loaded with solvent gas mixture, e.g. Ethylacetate and Ethanol, is led through the inlet (13'a) to the sorption plant (1'). The purified waste gas leaves the outlet (13'b) of the sorption pliant (1'). This step of the sorption process is done until the sorption agent is saturated as to its lead capacity for one or several solvent components. Finally, the sorption process is interrupted and the sorption plant (1') is gradually desorbed. For this purpose, heated desorption air is led via the heater (6') to an inlet (14'a) into the sorption plant (1').

The desorption gas enriched with a solvent gas fraction is led through the outlet (14'b) to a cooling device (2') in order to have the gas temperature decreased to a certain level and then led to the intermediate sorption device (3'). The desorbed solvent gas fraction undergoes a selective sorption process selective at various intervals. Therefore, in contrast to the sorption plant an improved, separated sorption of each component of the desorbed solvent gas fraction is achieved.

Following the intermediate sorption plant (3'), the desorption gas released of solvent gas is led via the heater (6') and returned to the sorption plant (1').

With means of a measurement device (10') for the solvent gas mass flow, which records the mass flow from the sorption gas duct, the end of the desorption process of the first solvent gas fraction from the sorption plant (1') can be determined.

In the next step the intermediate sorption plant (3') enriched with the first solvent gas fraction undergoes fractionalized desorption at a preset desorption temperature. The first solvent gas fraction desorbed at a certain temperature is cooled by means of a cooling device (4') and finally condensed in the condensating device (5'). The quality of condensed solvent is controlled with an adequate measuring device (9') which also controls the switching and distributing device (7') so that each solvent can be collected in various collecting vessels (8'). In case of solvent gases which show almost similar sorption behaviour during the desorption process while transferring, two solvents are created in a mixed fraction which are led in a rejection vessel (11') to be foreseen for this process. In the same way it is recommendable to lead the residual solvents from the fractionalizing, remaining in the ducts after the condensating device (5') into the rejection vessel (11') with the help of a time switching device (washing).

In the following the temperature of the ventilated desorption gas led through the intermediate sorption plant (3') may be increased by a heater (6') in order to desorb, condense and collect further solvent gas fractions from the intermediate sorption plant (3').

In case the intermediate sorption plant (3') is completely empty, the desorption gas led in the cycle through the sorption plant (1') is adjusted by means of the heater (6') to a higher temperature to release the next solvent gas fraction off the sorption plant (1') which is then cooled by the steps mentioned above by means of a cooler (2'), again treated in a selective sorption process in the intermediate sorption plant (3') in various steps and finally desorbed from this plant, cooled in the cooling device (4'), condensed in the condensating device (5') and collected via switching and distribution device (7') in various collection vessels (8').

In the following the invention is explained with an example:

EXAMPLE

In this example the selective solvent recovery from a solvent gas mixture, consisting of Toluol and Ethanol is carried out, according to the invention and using the device as shown in FIG. 1.

It is started with a gas mixture of 80 Vol. % Ethanol and 20 Vol. % Totuol. This gas mixture is adsorbed under the following conditions in an adsorption plant filled with activated carbon.

| | |
|---|---|
| Adsorption temperature: | 15° C. |
| Adsorpton pressure: | 1 bar |
| Adsorption carrier gas: | air |
| Load of the carrier gas with solvent gas mixture: | 4 g/m$^3$ |
| activated carbon | type chemviron, WS 45, specific surface: 1,400 m$^2$/g |

The adsorption process is stopped, when the quantity of ethanol in the purified waste air, leaving the adsorber, exceeds the limit value of 200 mg/m$^3$ waste air.

In the following, the adsorber is desorbed. For the desorption the following conditions are set:

| | Step I | Step II |
|---|---|---|
| Desorption temperature: | 110° C. | 150° C. |
| Desorption pressure: | 1 bar | 1 bar |
| Desorption carrier gas: | air | air |
| Fraction: | Ethanol | Toluol |

The solvent gas fraction desorbed in step I is cooled to a temperature of −45° C. and condensed at this temperature. The quality of the condensed solvent is measured by means of a refractometer and the flow quantity of the condensed solvent is recorded by means of a floating measurement device (Rotameter). In a first collection vessel ethanol is gained with a purity of 95%.

After determinating the decrease of the ethanol mass flow with the help of the floating measuring device, the desorption temperature is increased to 150° C. (step II), and the condensed solvent flow, which contains 5% ethanol impurity is Toluol sufficiently pure for a technical purpose, and led to a second container.

If purer Toluol is required, an intermediate temperature of 130° C. can be used for approximately 5 minutes. The mixed fractioned which then is produced may be led to a separate collection vessel. In this case the Toluol is recovered with a purity of 98%.

With the procedures according to the invention and the device according to the invention it is possible to recover solvents from sorbent gas mixture in a selective process and thus saving expensive installations and high energy costs. Considering today's approach towards an enforced protection of the environment such a recovery technique is of utmost importance for the state-of-the-art technology and the economy.

We claim:

1. A process for the selective recovery of solvents from a solvent gas mixture comprising the steps of fractionally sorbing a solvent gas mixture in a sorption agent to form individual solvent gas fractions in the agent, desorbing the individual solvent gas fractions from the sorption agent with a desorption gas in a fractionated manner, condensing these individual desorbed solvent gas fractions in a staggered-in-time manner to form a condensed solvent fraction flow, measuring the composition of the solvent fraction in the desorption gas from the sorption agent or of the solvent fraction in the condensed solvent fraction flow and separately collecting one solvent fraction from another depending on the measured composition of the solvent fraction.

2. The process of claim 1, wherein the composition of the solvent fraction in the desorption gas is measured with a caloric concentration measuring device or a total hydrocarbon detector or both.

3. The process of claim 1, wherein the composition of the solvent fraction in the condensed solvent fraction flow is measured with a refractometer or a density device or both.

4. The process of claim 1, wherein the step of sorbing the solvent gas mixture is an adsorption or absorption step.

5. The process of claim 1, wherein the solvent gas mixture is sorbed at a pressure of from 1 bar to 10 bar and at a temperature of from −20° C. to 80° C.

6. The process of claim 1, wherein the solvent gas mixture is moved through the sorption agent with a carrier gas.

7. The process of claim 1, wherein the individual solvent gas fractions are desorbed in a fractionated manner from the sorption agent by the desorption gas at a constant pressure and a constant temperature.

8. The process of claim 1, wherein the individual solvent gas fractions are desorbed in a fractionated manner from the sorption agent by stepwise reducing or stepwise increasing the temperature or both.

9. The process of claim 8, wherein the desorption pressure is decreased or the desorption temperature increased, or both, when the gas flow of an individual solvent gas fraction desorbed from the sorption agent falls below a certain level to cause desorption of a further individual solvent gas fraction from the sorption agent.

10. The process of claim 1, wherein the individual solvent gas fractions are desorbed in a fractionated manner from the sorption agent at a pressure in the range of from 1 bar to 10 bar and at a temperature of from 35° C. to 200° C.

11. The process of claim 1, wherein the individual solvent gas fractions are desorbed in a fractionated manner out of the sorption agent with a carrier gas.

12. The process of claim 1, wherein the individual solvent gas fractions in the desorption gas desorbed from the sorption agent are again sorbed in an intermediate sorption agent and subsequently desorbed in a fractionated manner, the individual fractions from the intermediate sorption agent being condensed and collected separately from one another.

13. The process of claim 12, wherein the individual solvent gas fractions desorbed from the sorption agent are sorbed in the intermediate sorption agent at a lower temperature or higher pressure or both compared to the temperature and pressure used when the individual solvent gas fractions are desorbed from the sorption agent.

14. The process of claim 12, wherein the individual solvent gas fractions are desorbed from the intermediate sorption agent at a pressure and a temperature which correspond to the pressure and the temperature used when the individual solvent gas fractions are desorbed from the sorption agent.

15. The process of claim 12, wherein unsorbed gas emitting from the intermediate sorption agent is adjusted to the pressure and the temperature used in the desorption from the sorption agent and returned back to the sorption agent.

16. The process of claim 12, wherein the individual solvent gas fractions desorbed from the intermediate sorption agent are dried before being condensed.

17. Apparatus for the selective recovery of solvents from a solvent gas mixture comprising a sorption means for fractionally sorbing a solvent gas mixture to form individual solvent gas fractions, means for passing said solvent gas mixture through the sorption means and recovering purified gas from which the solvent gas mixture has been removed by the sorption means, means for circulating a desorption gas through the sorption means for fractionally desorbing individual solvent gas fractions from the sorption means and into the desorption gas, means for condensing the individual desorbed solvent gas fractions in a staggered-in-time manner to form a condensed solvent fraction flow, means for measuring the composition of the solvent fraction in the desorption gas from the sorption means or the solvent fraction in the condensed solvent fraction flow from the condensing means, a plurality of containers for separately collecting one solvent fraction from another, and means for switching the condensed solvent fraction flow from one container to another depending on the measured composition of the solvent fraction.

18. The apparatus of claim 17, wherein the sorption means comprises a device containing a bed of sorption material, an inlet for the solvent gas mixture and a corresponding outlet for the purified gas and an inlet and an outlet for circulating desorption gas through the sorption material.

19. The apparatus of claim 18, including heating means for heating the circulating desorption gas.

20. The apparatus of claim 17, including a first cooling means for cooling the desorption gas, an intermediate sorption means between the first cooling means and the condensing means and a second cooling means for cooling the desorption gas between the intermediate sorption means and the condensing means.

* * * * *